A. L. FINCH.
Stove Leg.
No. 112,437.　　　　　　　　　　　　　　　Patented Mar. 7, 1871.
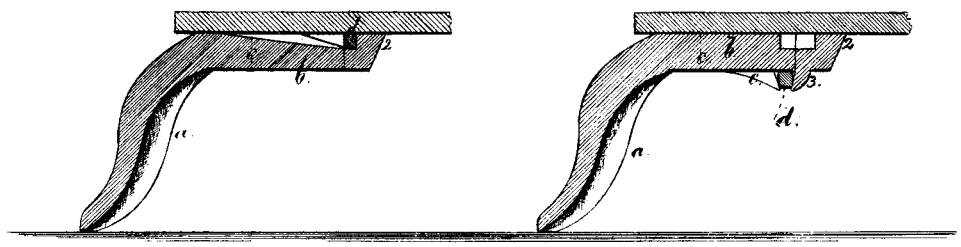
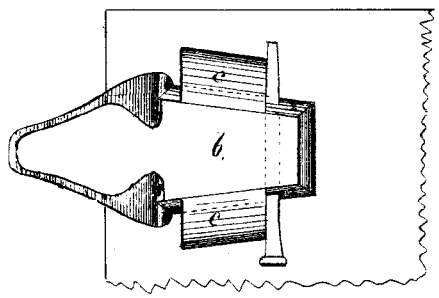 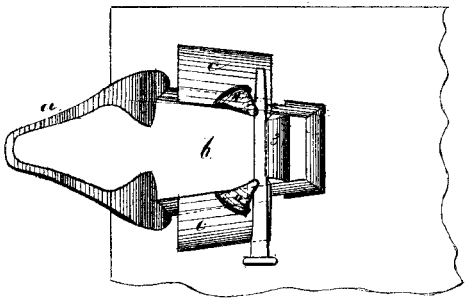
Witnesses　　　　　　　　　　　Inventor
Chas. H. Smith　　　　　　　　　Amon L. Finch
Geo. A. Walker　　　　　　　　　L. W. Serrell
　　　　　　　　　　　　　　　　　　atty

United States Patent Office.

AMON L. FINCH, OF SING SING, NEW YORK.

Letters Patent No. 112,437, dated March 7, 1871.

IMPROVEMENT IN STOVE-LEGS.

The Schedule referred to in these Letters Patent and making part of the same.

*To all whom it may concern:*

Be it known that I, AMON L. FINCH, of Sing Sing, in the county of Westchester and State of New York, have invented an Improvement in Stove-leg Fastenings, and the following is declared to be a correct description thereof.

Stove-legs are usually made with a tapering tongue, that is entered between dovetailed lugs upon the under side of the stove.

These legs are liable to fall off, especially in moving the stove, or when the leg does not rest firmly upon the floor or support below.

My invention is for locking the leg into its place, so that it may not fall out accidentally, and for this purpose I make use of a tapering key, such as a nail, introduced transversely of the tongue, and taking the dovetail lugs so as to prevent the leg falling off.

In the drawing—

*a* represents the stove-leg, of any usual size or shape, and

*b* the tapering shank thereof.

*c c* are the dovetail lugs upon the base of the stove, for receiving the tongue between them, as usual.

*d* is the key or nail introduced transversely to the shank *b* of the leg, and taking against the lugs, to prevent the leg slipping out from between the lugs *c c*, and thereby becoming detached.

In Figure 1, which is an inverted plan, and Figure 2, which is a cross-section, the transverse key *d* is inserted next the stove-plate, in a recess upon the upper surface of the shank *b*, and acting as a wedge between the lip 2 of the shank and the ends of the lugs *c c*; but in some forms of stoves it would be difficult to introduce this transverse key so closely to the surface of the stove-plate; I therefore form a projection, 3, upon the shank *b*, as seen in section in Figure 3, and by an inverted plan, Figure 4, and also cast lugs or projections 4 4 upon the lugs *c c*, so that the tapering key or nail may be introduced transversely, to hold the legs from moving in the lugs *c c*, as aforesaid.

By this means the risk of injury from the legs falling out is removed, and there is little or no additional cost in constructing the parts.

I do not claim a bolt, pin, or wire, passed through the leg or through ears thereon, as it is expensive to bore the holes for the same, and under some circumstances almost impossible, and there is no assurance that the leg will fit in any other place than the special one to which it is applied when the hole is bored.

In my device these difficulties are avoided, and the tapering key acts to keep the leg in its place and throw the weight upon the lugs instead of the key.

I claim as my invention—

The stove-leg shank *b*, and dovetail lugs *c c*, made in substantially the manner specified, for the reception of the transverse tapering key *d*, as set forth.

Signed by me this 6th day of December, A. D. 1870.

A. L. FINCH.

Witnesses:
   G. S. HOORNBEEK,
   JOAKIN URNNY.